(12) United States Patent
Kern et al.

(10) Patent No.: US 6,248,280 B1
(45) Date of Patent: Jun. 19, 2001

(54) METHOD OF MANUFACTURING A RESPIRATOR CARTRIDGE SEAL

(75) Inventors: John J. Kern, Fullerton; Anthony V. Osborne, Rancho Cucamonga, both of CA (US)

(73) Assignee: Bacou USA Safety, Inc., Smithfield, RI (US)

( * ) Notice: Subject to any disclaimer, the term of this patent is extended or adjusted under 35 U.S.C. 154(b) by 0 days.

(21) Appl. No.: 09/597,932

(22) Filed: Jun. 20, 2000

Related U.S. Application Data

(62) Division of application No. 09/060,656, filed on Apr. 15, 1998, now Pat. No. 6,099,293.

(51) Int. Cl.$^7$ .......................... B29C 39/08; B29C 39/10
(52) U.S. Cl. .......................... 264/263; 264/268; 264/270
(58) Field of Search .......................... 264/261, 263, 264/267, 268, 270, 271.1, 310, 311; 128/205.27, 206.17; 425/576, 435, 129.1

(56) References Cited

U.S. PATENT DOCUMENTS

| | | |
|---|---|---|
| 1,536,857 | 5/1925 | Hudson . |
| 1,781,254 | 11/1930 | Stelzner . |
| 2,269,461 | 1/1942 | Lehmberg . |
| 2,798,483 | 7/1957 | Kashima . |
| 3,944,403 | 3/1976 | Simpson et al. . |
| 4,078,036 * | 3/1978 | Keefer ................................ 264/261 |
| 4,154,586 | 5/1979 | Jones et al. . |
| 4,373,635 * | 2/1983 | Mules ................................ 264/261 |
| 4,438,057 * | 3/1984 | Sundseth ............................ 264/261 |
| 4,543,112 | 9/1985 | Ackley et al. . |
| 4,548,626 | 10/1985 | Ackley et al. . |
| 4,686,976 | 8/1987 | Bakkila et al. . |
| 4,714,486 | 12/1987 | Silverton et al. . |
| 5,063,926 | 11/1991 | Forsgren et al. . |
| 5,458,844 * | 10/1995 | MacDougall ...................... 264/310 |
| 5,507,632 * | 4/1996 | Payne ................................ 425/435 |
| 5,531,803 | 7/1996 | Salapow et al. . |
| 5,868,979 * | 2/1999 | Glenn ................................ 425/435 |
| 5,911,938 * | 6/1999 | El et al. ............................. 264/310 |
| 5,922,267 * | 7/1999 | Brscia et al. ...................... 264/310 |

* cited by examiner

Primary Examiner—Angela Ortiz
(74) Attorney, Agent, or Firm—George F. Bethel

(57) ABSTRACT

A process and apparatus for forming a seal between a filter cartridge wall and a pleated filter disposed within the cartridge having a support for rotating the cartridge. A nozzle is connected to a source of sealant for injecting sealant into an area between the wall of the cartridge and the filter media. A valve connected to the nozzle valves sealant to the nozzle and has a draw back feature after a desired amount of sealant is injected. The method for sealing the filter media to the wall of the cartridge includes rotating the filter cartridge while disposing a nozzle into the interior of the cartridge and injecting a sealant through the nozzle controlled by a valve. The valve draws flow backwardly from the nozzle at the termination of the injection of sealant.

18 Claims, 5 Drawing Sheets

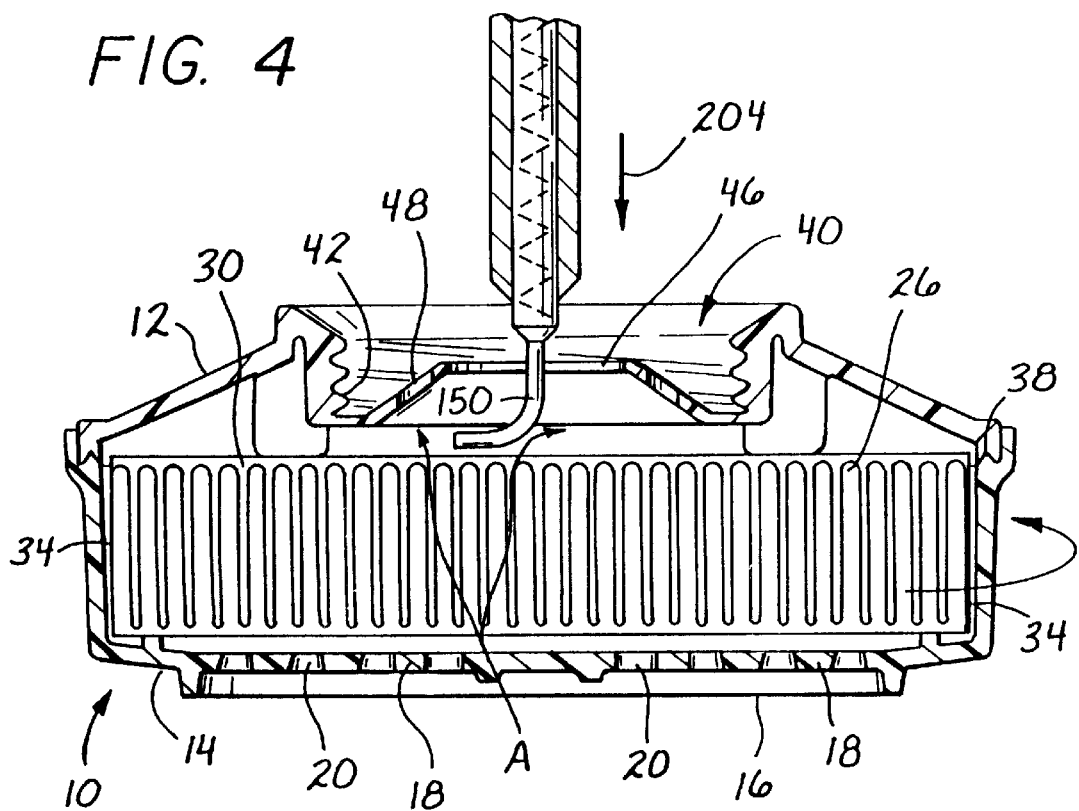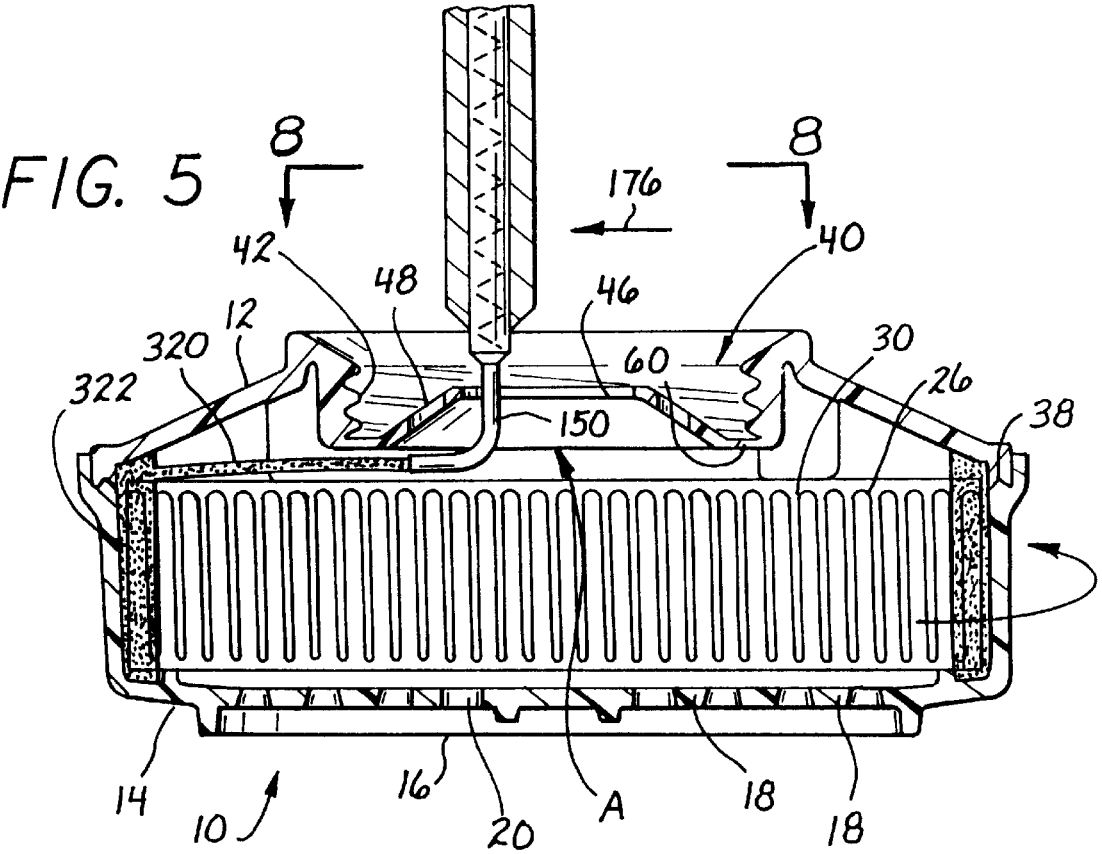

METHOD OF MANUFACTURING A RESPIRATOR CARTRIDGE SEAL

This application is a division of Ser. No. 09/060,656 filed Apr. 15, 1998, U.S. Pat. No. 6,099,293.

BACKGROUND OF THE INVENTION

1. Field of the Invention

The field of this invention lies within the art of respirator filter cartridges. It particularly relates to respirator particulate filters which have a filter media such as filter paper that is pleated and emplaced in a cartridge. The cartridge and paper is then sealed to prevent air passage around the filter media. It particularly relates to the field for the cartridge as well as the method of applying the seal.

2. Description of the Prior Art

A number of filter cartridges have evolved over the years. Many of the filter cartridge designs incorporate a filter cartridge having pleated filter media therein. The reason for the pleated filter media is due to the large surface area which the filter media encompasses thereby allowing for significant inflow of air that is to be filtered through the cartridges.

Such pleated filters generally rely upon pleats of material that are pleated and then bonded together so as to allow for a gap between the pleats of the media. As can be appreciated, if the filter media is at all clogged or filled with such items as sealant or other obstructions, the efficiency of the filter drops significantly.

In the past, there has been a significant problem in sealing filter media to a cartridge. The sealant often times is dripped or disposed onto the filter media. This creates closures or obstructions of the filter media so that it can not function correctly. Various methods have been employed to emplace a sealant with the filter media in the cartridge thereby preventing any migration or channeling of air around the filter media.

The prior art has tried to solve the problem of creating a seal without wetting the filter media with sealant. However, it has failed in great measure to eliminate the adhesive residue on the exterior of the filter and often times on the filter media itself.

Such designs as a plurality of spokes from a central hub extending radially outwardly have been utilized. The thought being that the spokes from the radial hub can disperse liquid sealant to the exterior for sealing. In such a manufacturing process, the adhesive is put on a central hub and allowed to centrifugally move along the spokes to the exterior and then be deposited against the interface of the filter media and the filter cartridge.

With such designs, the sealant is dispensed onto the center hub and after curing and drying remains on the hub. This is not only clearly visible but often times migrates to the filter media itself.

Other designs dispense the sealant onto the top outer surface of the filter body. This design also relates upon a centrifugal force to clear the sealant off the dispensing surface. However, because of the surface tension and the fact that very little energy is imparted into the sealant near the center of rotation a residual amount of sealant remains on the dispensing surface. The remaining sealant is left to cure on the exterior of the filter body.

Other methods have been provided in order to seal filter media to a cartridge. However, when such devices have been tried, they have been costly. For instance, in some cases, the adhesive or sealant is disposed around the edge of the media prior to manufacturing the entire cartridge. Also, dynamic means of maintaining the adhesive or sealant around the media during the manufacturing process have been tried. None have been eminently successful as to maintaining a clean filter media as well as a cartridge.

This particular invention overcomes the deficiencies of the prior art by creating a unique seal in a filter assembly. The seal is created by injecting a pressurized sealant into a rotating assembly. The sealant forms a seal between the inner wall of a two piece molded body and a pleated filter disk.

The result of the process is a respirator filter which is clean and free of adhesive residue. Furthermore, it provides for a clean application and non-clogging of the adhesive on the filter media itself or on the exterior surfaces of the respirator filters. The result is that a substantially un-clogged filter media is provided with a proper seal at the exterior surfaces of where the filter media interfaces the interior of the cartridge. This sealant is a reliable sealant to create the seal while at the same time avoiding the substantial problems of the prior art.

SUMMARY OF THE INVENTION

In summation, this invention provides a filter cartridge and process for sealing filter media to the interior of the cartridge with a sealant that is formed while injecting a sealant into a rotating filter cartridge and then curing the sealant.

More particularly, the process incorporates a seal that is dynamically disposed into a filter cartridge. The sealant is injected by a pressurized process through the movement of a sealing nozzle into an area to allow for the spray of sealant into an interfacing area between a cartridge wall and the filter media.

The injection of the stream of sealant is then curtailed through a snuff back valve which prevents further dripping of the sealant onto the filter media. This is by means of valve spools in the valve which retract to draw the sealant material in the spray nozzle of needle into the interior so that it does not trail off the end of the nozzle.

The cartridges are rotated at approximately 800 revolutions per minute (rpm) while the nozzle or needle is spraying sealant thereinto. This rotation maintains the sealant against the walls of the cartridge as well as allowing for subsequent cure.

The nozzle, once placed in position allows the stream of sealant to travel over the filter media and not touch it, and at the same time strike the inside of a molded cartridge body. Due to gravity and centrifugal forces, the sealant flows downwardly and outwardly to create a uniform seal between the body of the cartridge and the filter media.

The foregoing will be seen to be an effective sealant providing a unique cartridge for respirator purposes as seen in the following specification.

BRIEF DESCRIPTION OF THE DRAWINGS

FIG. 4 shows the nozzle or needle having moved downwardly into the cartridge as cross-sectioned in preparation to inject sealant into the interface between the filter media and the cartridge wall.

FIG. 5 shows the actual injection of the sealant being applied after the nozzle has moved inwardly toward the periphery of the cartridge wall as cross-sectioned.

FIG. 6 shows a cross-sectional view of the valve utilized to draw back or snuff back the sealant as well as control the injection thereof.

FIG. 8 shows a plan view looking downwardly at the cartridge opening along lines 8—8 of FIG. 5.

DESCRIPTION OF THE PREFERRED EMBODIMENTS

Figure 1:
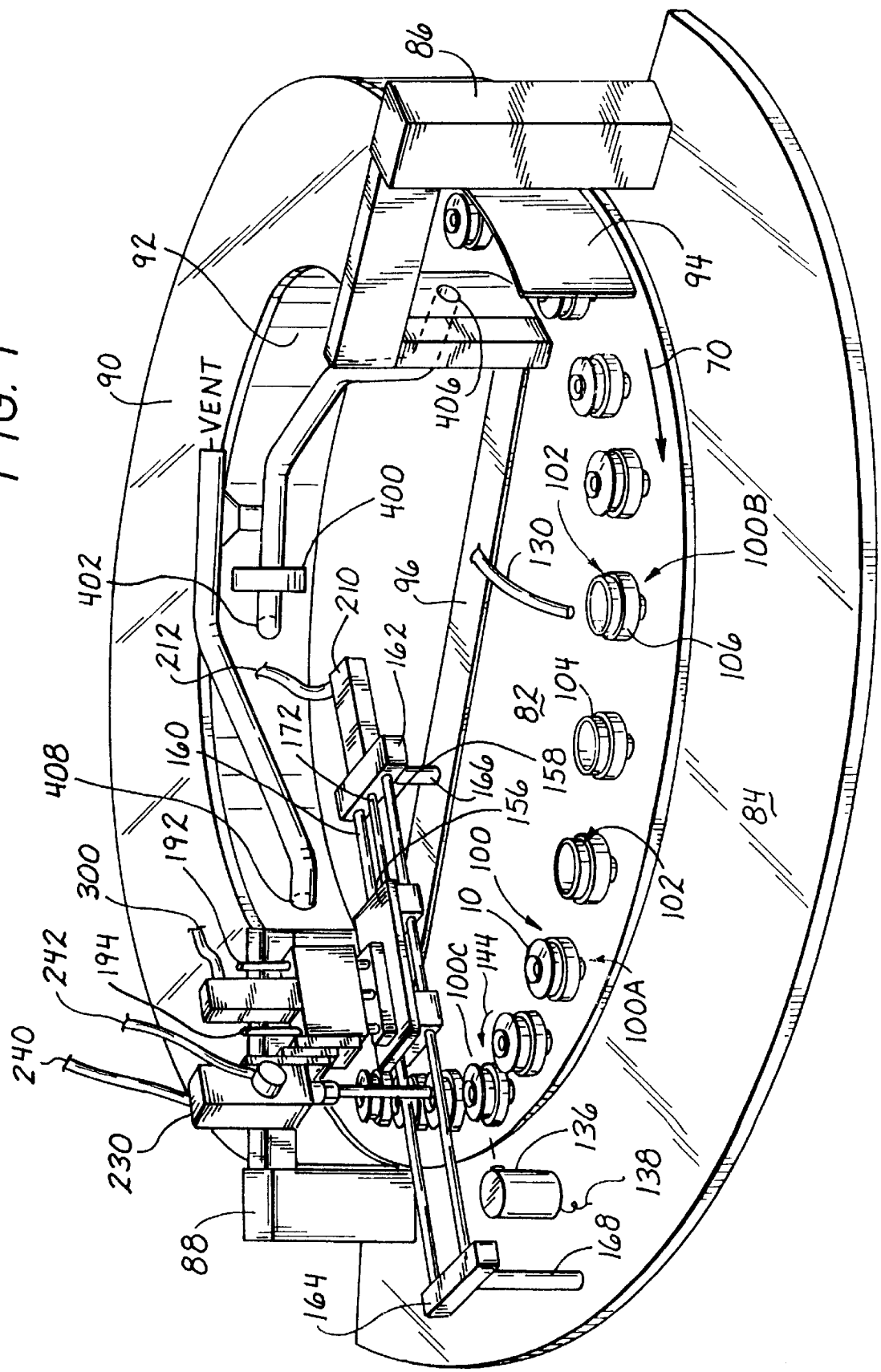
FIG. 1 shows a perspective view of the process equipment for manufacturing the respirator cartridges of this invention.

A number of cartridges have been shown being processed in FIG. 1. These filter cartridges are shown in greater detail in FIGS. 4, 5 and 8 as well as in the ancillary figures. These cartridges will be shown in the process as set forth hereinafter.

Looking at FIGS. 4 and 5 which show the cartridges in a mid-line sectional view, it can be seen that the cartridge comprises a general cartridge filter member 10 having a cap, cover or lid 12 and a cup shaped canister or cylindrically walled lower portion 14. The lower portion 14 is formed as a cup like member with a grid work 16 at the base.

The grid work 16 comprises a number of cross grid members 18 which allow for the passage of air through openings or interstices 20. The openings or interstices 20 communicate with the interior and allow for the intake of air therethrough that is to be filtered by a pleated filter paper or media 26. The pleated filter paper or media 26 is pleated from a large stock of material and then cut into a round biscuit like configuration.

The pleated filter paper is made from a micro-fibrous glass filter paper. After it is pleated, it is provided with a glue line on the surface 30 of the edges of the pleats in lines across the top so that the filter paper will not shift backwardly and forwardly in an accordion like manner. The resin or adhesive 30 that has been placed across the top pleat edges forms a thin line like a thread like strand in about two or three locations per filter. These thread like strands can be seen in FIG. 8 as passing along the top edges of the filter. As can be seen in FIG. 8, they are of a significantly thin proportion as to the entire plan view of the filter paper or media 26.

Air being drawn into an opening such as opening 20 of the grid 16 should pass in the direction of arrow A and outwardly through the filter paper or media 26 to the outlet. Maintenance of the filter paper 26 in tight relationship with the bottom cup or canister at the circumference of the cup such as at the interior of the outside walls or circumference interface 34 should be maintained. To accomplish this, the seal that is utilized herein fills the interface gap 34 and maintains the filter in a tightened sealed relationship to prevent migration or channeling of air as it passes through the openings 20. This causes the air to pass in the direction of arrow A through the filter media itself rather than migrating toward the ends of the cup 14 and around the circumference of the filter paper 26.

As an aside, the cup 14 is formed in a molding process and is then bonded to the top or cap 12 by means of ultrasonic bonding at the circumferential area 38 surrounding the circumference of the cap 12 and the cup 14.

The cap 12 is formed with an interior depression or boss 40 having a series of female threads 42. These female threads 42 receive a series of male threads from a respirator that it is attached to in order to create a seal. The cap 12 has an enlarged opening 46 formed with a circumferential peripheral opening 48 and allows for the passage of air being breathed to move therethrough. A grid work formed with an interior grid member 50 can be seen in FIG. 8 which is a plan view along lines 8—8 of FIG. 5. This interior grid work 50 is supported by four quadrant grid members 52, 54, 56 and 58. These grid members are in turn again supported by a base portion 60 forming the area adjacent the female threads 42 that receive the male thread portion of the respirator in tight juxtaposition thereto.

One of the major problems with respirators is that the filter media 26 must be maintained with a clear passage for air from openings such as openings 20 up through openings 46 and 48 outwardly. However, at the same time the filter media 26 being very soft micro-fibrous material must be protected against fingers or impact against other items whether they be inadvertent or just from curious probing fingers. The grill work including grid members 52 through 58 and the interior rounded grid portion 50 are emplaced in the upper molded cap 12. This serves to prevent incursion of a user's fingers or other objects that would damage the filter media. However, this presents the problem of having to seal the filter media which has not been satisfactorily resolved to the satisfaction of the manufacturers or users of cartridges. As stated in the description of the prior art, it is necessary to place a sealant in the area adjacent the space 34 at the inner circumference of the outer walls, while at the same time not leaving any residue either on the top of the filter media 26, the filter cartridge itself, or the threads.

Looking more particularly at FIG. 1, showing the process of manufacture, it can be seen that an indexing table 82 is shown rotationally indexing in the direction of arrow 70. The indexing table 82 is driven by a drive motor not shown. The stations 100 are driven by a drive motor 72. The drive motor 72 is connected by means of a pulley or sheave 74 and idler pulleys 76 and 78 to a belt 80. This moves the belt 80 and stations 100 that will be described hereinafter in the direction of arrow 70.

The table is shown as table 82 which rotationally indexes within a peripheral apron 84. The indexing table 82 is driven by one indexing drive unit 75. The indexing drive unit 75 consists of a precision cam indexing mechanism and drive motor. It is mounted between the underside of the table and the support framework. In this manner it rotates the table to index each station or nest 102 upon command in a sequential manner. The peripheral apron 84 supports stanchions 86 and 88.

Stanchions 86 and 88 support a curing tunnel cover 90 forming the upper portion of a curing tunnel as seen with an inner wall 92 and an outer wall 94 that is in an arcuate relationship around the periphery of the table 82. The curing tunnel is also supported by means of a cross member 96. Cross member 96 also serves to support some of the operating elements of this invention as will be described hereinafter.

As the table 82 moves in the direction of arrow 70, it carries with it a series of stations 100 that can be seen moving around the table. These stations 100 are provided with a series of nests 102. The nests 102 are formed by a cup concave receptacle or socket 104. The cup or socket 104 is supported on a rotating base 106 that is in turn connected to a shaft 108. Shaft 108 is housed with a bearing housing 110 that is in turn bolted a flange 112 to the table 82 by means of bolts 114. The bearing housing 110 terminates with the shaft 108 being connected to a pulley or sheave 120 driven by the belt 80. This configuration allows the nests 102 to turn at a high speed and rotate a cartridge 10 that has been shown in the sockets 104 of the nests 102.

It should be understood that the table 82 can be substituted by a continuous belt or other means to hold the nests 102 for rotational movement in an automated process.

Variously sized nests 102 with sockets 104 can be emplaced within the base 106 so as to facilitate different sized cartridges being processed by this invention. In effect, the sockets 104 can be of various diameters or in variously sloped configurations to allow for the cartridge 10 to be placed therein and rotated.

The indexing drive unit 75 turns or rotates the table 82 in an indexing type manner. The belt and motor 72 only drives the stations 100 (see FIG. 2). This causes the bases 106 connected to shaft 108 to turn in a counter-clockwise direction and rotate the nests 102 in a rapid manner. The relative ratios of rotation are such where the belt 80 rotates the spindles 120 so as to allow the nests 102 to rotate at approximately 800 rpm. This serves the function of driving the adhesive that shall be described hereinafter in a manner by centrifugal force and gravity into the edge region 34 against the walls of the cartridges 10.

In order to implement the process, the cartridges 10 are placed in the sockets 104 incrementally such as shown in the empty station 100. The cartridges 10 can be emplaced by hand or in an automatic manner such as by vacuum, fluidic, hand or mechanical means whereby they are caused to move downwardly into the sockets 104 and placed therein. After processing, the cartridges 10 can be removed from the sockets 104 and dropped onto a conveyor belt or lifted to another area by vacuum, fluidic, hand or mechanical means.

In order to determine whether there is any cartridge 10 in a nest 102, a sensor tube 130 has been shown. The sensor tube 130 can hold an infrared sensor or any other type of sensor such an optical and other types in order to determine whether there is a cartridge 10 in the socket 104. The sensor 130 is electrically interfaced to warn or stop movement of the table 82 if there is a cartridge in the socket 104 so that it will not process onwardly and be moved through the like process again in the manner to be described.

As table 82 indexes nest 102 into a position adjacent to where a sealant is to be emplaced, a sensor 136 connected to a lead 138 is utilized. The sensor 136 can be an infrared or other type of sensor to determine whether a cartridge 10 has been placed in the nest 102 of a station 100 adjacent the sensor 136. These cartridges are to be emplaced in the sockets 104 for processing such as at station 100A. The cartridges again can be placed by a fluidic, mechanical, hand or vacuum placement means so that they are emplaced in the nest 102. This of course is after the cartridges have been displaced from the stations 100 so that there is no longer one at for instance station 100B.

Figure 2:
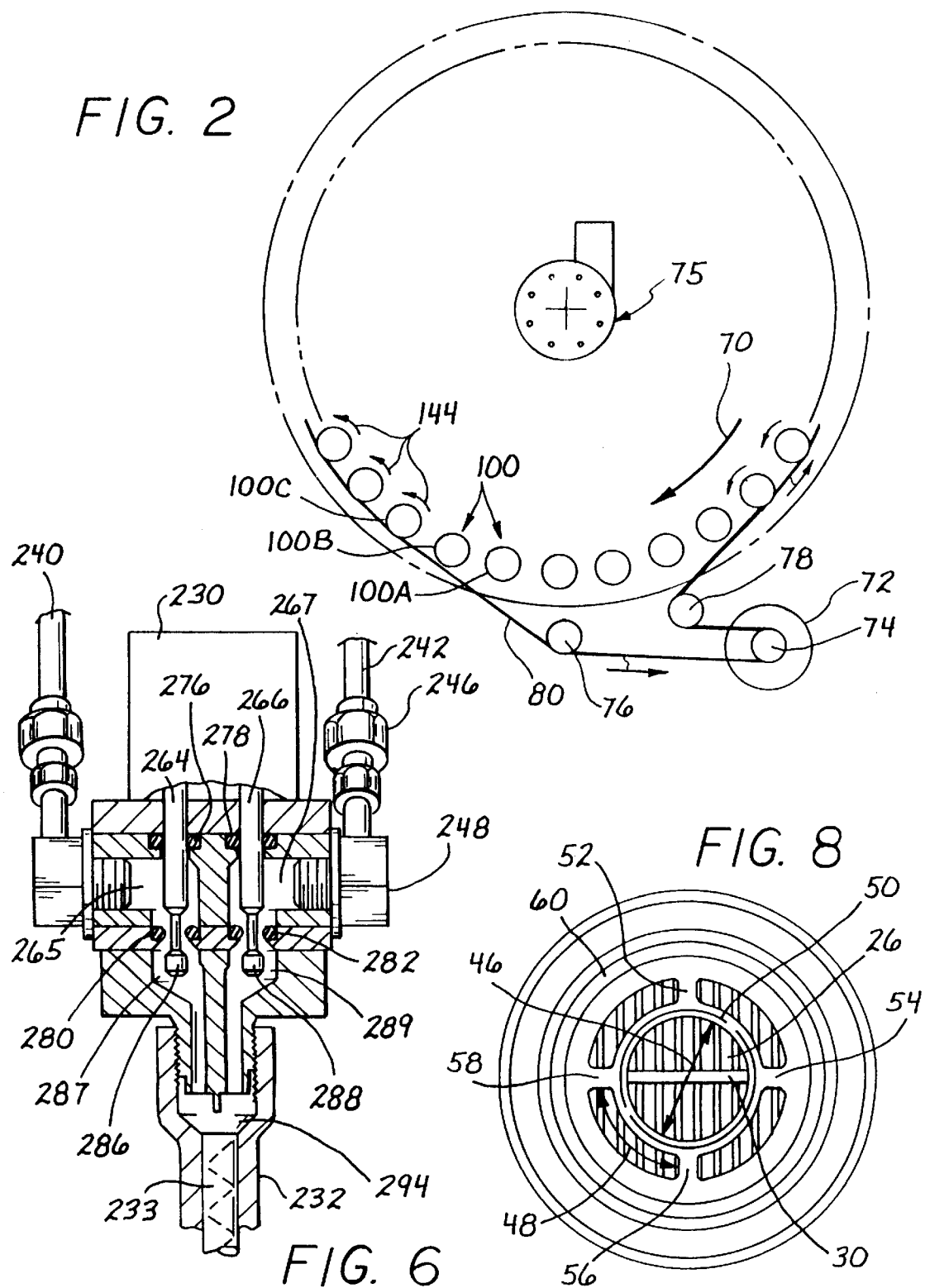
FIG. 2 shows a diagrammatic plan view of the respirator cartridges being manufactured and rotating on the table shown in FIG. 1.

When station 100A has a cartridge 10 in the nest 104, it is initially rotated in the direction of arrow 144. This is the point as can be seen in FIG. 2 where the belt 80 begins to pick up the spool or pulley 120 to initiate the rotation thereof. If there is not a cartridge 10 in the nest 102, it will be sensed by the sensor 136 at which time, the process can be stopped as to rotation of the table 82 and the other elements of the process. However, assuming that a cartridge 10 is in the socket 104 of nest 102 and it arrives at station 100C, the sensor allows the process to continue so that the injection of sealant in the process can begin.

Figure 3:
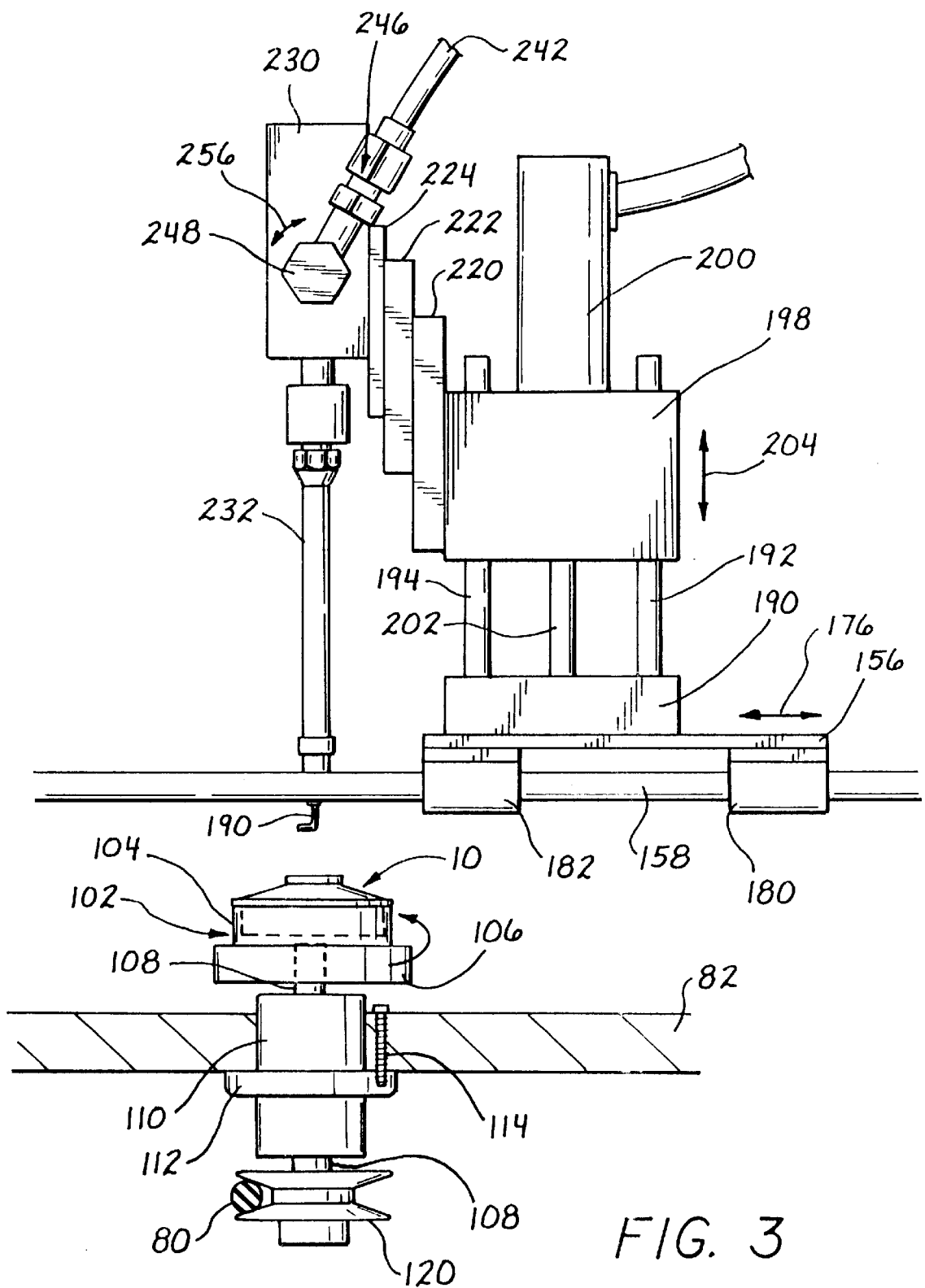
FIG. 3 is an elevation view taken from the side of FIG. 1 detailing the operating apparatus of this invention.

Application of sealant is initiated by injection through a needle or nozzle 150 that is shown in FIG. 3. The needle or nozzle 150 is formed as a right angle member, but can be formed with an arcuate or multiple angled turns. The needle or nozzle 150 is moved and driven on a sliding table 156. Sliding table 156 is supported by a pair of rods 158 and 160. The rods 158 and 160 are in turn supported by support structures comprising end supports or brackets 162 and 164. The end support 162 is supported on a stanchion 166 wile end support 164 is supported on another stanchion 168 that is supported in turn on the apron 84. Stanchion 166 is supported on cross member 196.

In order to drive the support table 156, a piston driven pneumatic rod 172 is provided. The rod 172 is connected to the movable table 156 to cause it to slide backwardly and forwardly on rods 158 and 160. This thereby causes the movement as can be seen in FIG. 3 backwardly and forwardly in the direction of arrow 176.

Table 156 is supported on rods 158 and 160 by means of bearings that can be roller bearings or other low friction bearing surfaces such as linear bearings within bearing members 180 and 182. Analogous bearing members, that can not be seen, support the table 156 on rod 160.

Connected to the table 156 is cylinder and rod support block 190. The cylinder and rod support block support two rods 192 and 194 that can be seen in both FIGS. 1 and 3. These in turn support a pneumatic piston support block 198 that travels upwardly and downwardly along rods 192 and 194. The movement is created by a pneumatic cylinder mounted in housing 200 that drives along rod 202 to provide for movement in the direction of arrow 204 upwardly and downwardly. Thus, movement can be accomplished along rods 158 and 160 in the direction of arrow 176 to move the entire mechanism inwardly and outwardly and in the direction of arrow 204 upwardly and downwardly.

Direction of movement in the direction of arrow 176 is provided by a pneumatic piston rod 172 that drives table 190. This is accomplished by a pneumatic cylinder within housing 210. Housing 210 creates movement through its pneumatic cylinder being operated through control lines 212. Thus, lateral or inward and outward movement is caused by pneumatic cylinder and housing 210 and upward and downward movement is caused by movement of a pneumatic cylinder in housing 200.

In order to mount the block 198 to a nozzle or needle injection head, a grouping of block supports 220, 222 and 224 have been shown. However, any configured brace, bracket or holder that suitably mounts support 198 to the needle or nozzle support and valve member can be used. Also to this extent any means to drive the needle or nozzle respectively in the direction of arrows 176 and 204 can be used, such as electro mechanical servos, solenoids or other fluidic or mechanical actuators.

A valve housing 230 is shown connected to a nozzle needle holder or injector 232 that is in turn connected to the needle or nozzle 150. The nozzle holder 232 is connected to the valve housing 230 that can be seen in FIG. 6. Valve housing 230 is connected to a resin or adhesive line 240 and a hardener line 242. These two respective lines 240 and 242 are connected to the valve housing 230 by means of a fitting generally shown as fitting 246 which is connected to a pivotal valve connection 248. The pivotal valve connection 248 allows the lines 240 and 242 to move arcuately in the direction of the arrow 256 that has been shown in FIG. 3. This permits rotational movement as the nozzle or needle holder 232 moves upwardly and downwardly as well as inwardly and outwardly in the manner to be described.

Looking more particularly at the showing of FIG. 6 which shows a fragmented view, it can be seen that two valve stems, spools, valve heads or spindles 264 and 266 have been shown. These valve spools 264 and 266 are connected to the inlet lines 240 and 242 respectively carrying the adhesive or resin and the hardener the combination of which forms the sealant. The mixing process for the resin and hardener to form the sealant in the two lines 240 and 242 is proportionally effected by a proportionalizing and pumping system as will be seen in FIG. 7. When the resin or adhesive arrives with the hardener at the valve housing 230 controlled by valve spools 264 and 266, it is in a correct proportion.

Valve spools 264 and 266 are sealed by dynamic seals in the upper portions namely seals 276 and 278. In their lower areas they are sealed by seals 280 and 282. These respective seals allow the valve heads and the valve stems of the valve spools 264 and 266 to move upwardly and downwardly and be sealed by the seals 276 and 278. The valve spools or spindles 264 and 266 have necked down portions that terminate in heads 286 and 288 that are sealed against the respective seals 280 and 282 in their closed position. The valve heads 286 and 288 are connected by the narrow or necked down portion of the spindle as can be seen connected to the main body of the spools 264 and 266. The necked down portion allows for the passage of adhesive and hardener into an injection mixture area 294 for further passage through the holder 232 to the hollow needle or nozzle 150.

One of the most important features of this invention is the pneumatic cylinder 230 action when it lifts and moves the spools or spindles 264 and 266 inwardly and outwardly. This provides for the flow of fluid through the adjacent chambers when it moves downwardly or outwardly. It also allows for a drawing back or snuffing back of the fluid within the needle or nozzle housing 232 within passage 233 when the spools 264 and 266 move upwardly or inwardly. This reverse or inward movement of spools 264 and 266 fundamentally draws the sealant backwardly so that it does not create a dribble, stream, or residual dropping of sealant onto the cartridge 10.

Looking more specifically at the process in conjunction with FIGS. 4 and 5, it can be seen that in order to implement a stream of sealant at station 100C, it is necessary to drive the housing 198 downwardly in the direction of arrow 204. This causes the needle 150 to be emplaced within the cartridge as seen in FIG. 4 namely through cartridge opening 46. At this point, the needle or nozzle 150 overlies the top of the filter media 26.

As the cartridge 10 is spinning, the needle 150 is then moved by the movement of support 190 through the action of pneumatic cylinder 210 in the direction of arrow 176. The movement can take place with and without spinning of the cartridge 10 in the direction of arrow 144. However, to be such where a degree of surety is provided, the spinning should take place as previously stated at station 100A so that it arrives at approximately a speed of 800 rpm for purposes of dispersing the sealant in the most effective manner.

At the point where the nozzle 150 is shown in FIG. 5 in proximate location to the periphery of the opening 46, the valves provide the sealant by movement of the pneumatic cylinder housing 230. Specifically valve stems and spools 264 and 266 are opened by lowering to provide a flow of adhesive and hardener forming the sealant under pressure that can be seen as a stream 320. Stream 320 is injected for a time period long enough to allow for sealant to be centrifugally driven to the outside walls and gravitationally fed into the interfacing space 34. This can be seen now as adhesively sealed area 322 that peripherally surrounds the interior of the cartridge cup or canister 14. The process continues by the cartridge continuing to spin in the respective station that it is at and continues while the sealant that has been injected cures.

In order to assure that the stream of adhesive does not drip onto the filter media 26 or onto any part of the cartridge, the valve spools 264 and 266 are withdrawn or pulled upwardly. This is performed by the pneumatic cylinder 230 moving backwardly such that it draws the adhesive and hardener in their respective chambers inwardly into their adjacent chambers 265 and 267. The lower chamber areas namely areas 287 and 289 when the heads 286 and 288 withdraw backwardly, have the sealant pulled backwardly or snuffed back. This snuffing back of sealant attendantly draws the sealant in the needle or nozzle passage 233 backwardly. This causes a withdrawal of the material in the bore of the needle and nozzle extension 233 to be pulled upwardly or snuffed backwardly so that it does not drip out of the end of the nozzle or needle. The foregoing is accomplished by means of the fluidic displacement of the ends of the spools 286 and 288 drawing the fluid backwardly in a pull back or snuffing back manner.

The urethane adhesive requires approximately two and one half minutes to cure. It should be cured at approximately 75° to 100° F. However, for certain urethanes and other adhesives, the tunnel 90 can be provided with a heated source of air or other heating means. Furthermore, removal of any volatiles or other airborne materials can be effectuated through a fan 400 that has been shown connected to an opening 402 in the tunnel 90. It can also recirculate the flow by having its input drawn at the ends 406 and 408. This withdraws the flow at such points with the attendant volatiles or other material and recirculating it by the fan 400 or in turn circulating it outwardly into another vent.

Various sealants can be used. These include industrial adhesives or bindings, liquid polyisocyanate prepolymers used as coating and adhesive systems.

Two part systems consisting of a catalyst such as an active hydrogen monomer and an isocyanate, mostly commonly methylene diphenylene diisocyanate (MDI). Another widely used isocyanate is toluene diisocyanate (TDI). Blends of TDI and MDI are also used.

Most polyurethane (PUR) systems are processed by mixing-activated polymerization based on two or more liquid, solvent-free, monomer streams called components. Two-component systems are the most common.

Figure 7:
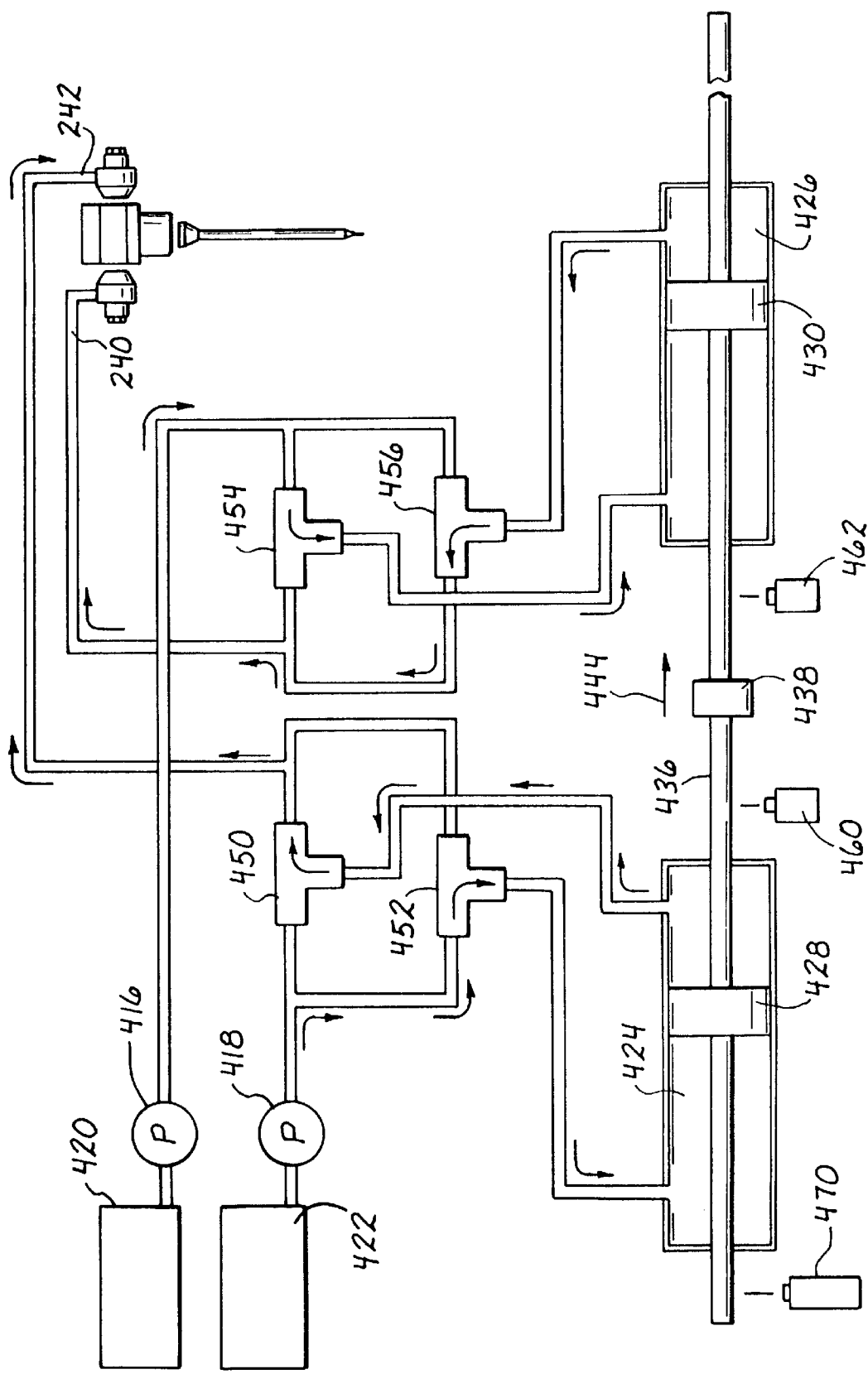
FIG. 7 shows a diagrammatic view of the sealant control and distributing system.

In order to provide positive pressure at the valve nozzle outlet as controlled by the spindles or spools 264 and 266, the method as seen in FIG. 7 has been implemented. FIG. 7 specifically shows a pair of pumps 416 and 418 connected to respective tanks of resin or adhesive 420 and hardener 422. The pumps 416 and 418 maintain positive pressure in the direction of the arrows as shown until a signal causes a reversal through the three way valves as will be described hereinafter.

Pumps 416 and 418 respectively maintain positive pressure of the resin and the hardener into two respective cylinders 424 and 426. Cylinder 424 is utilized for the hardener and cylinder 426 is utilized for the resin. The proportion in this particular case of resin to hardener is such wherein the cylinder for the hardener is approximately in a ratio of 1.32 to 1.5 with respect to the resin cylinder 426. Thus, for every movement of the pistons 428 and 430, a proportionalized amount of hardener of 1.32 to 1.5 resin is effected. This is based upon the cylinder diameters respectively 424 and 426 to implement the ratio of 1.32 hardener and 1.5 resin by driving the pistons 428 and 430 on a unified single rod 436 that is interconnected by a connection 438.

As the rod 436 moves in the direction of arrow 444 it draws and drives hardener as can be seen in the direction of the arrows through the hardener connection 242. At the same time, piston 430 in proportionalizing resin in cylinder 426 through resin line 240. This is also in the same direction of the arrows as shown. This proportionalizing is taking place with the pumps 416 and 418 providing constant pressure.

Further to this extent, a pair of three way valves 450 and 452 are shown in order to provide passage of the hardener through the line 242 in the direction of the arrows as shown.

In like manner, a pair of three way valvev 454 and 456 are shown to allow for the passage of resin or adhesive into the line 240 in the direction of the arrows as shown so that they can both be properly proportionalized by the respective pistons 424 and 426 for the hardener and the resin.

Sensors 460 and 462 are shown for sensing the movement of the connector 438. In this particular showing, when the connector 438 is being driven in the direction of arrow 444 it arrives at sensor 462. Sensor 462 senses the position and signals that the direction should be in the reverse of arrow 144, so that the drive of rod 436 is in the opposite direction.

The sensor 462 also signals to provide a unified reversal of the respective valves 450, 452, 454 and 456. Flow then goes in the opposite direction out of the proportionalizing cylinders 424 and 426 which is in the opposite direction from the arrows shown in FIG. 7. Consequently, a continuous proportionalizing and drive of the adhesive and resin can take place under the positive pressure of the pumps 416 and 418. Final flow is controlled by the pneumatic cylinder action of pneumatic cylinder housing 230 controlling the valve spools 264 and 266.

In order to provide for a pre-established flow through the valve spools 264 and 266, a movement of rod 436 is measured by a sensor 470. Movement of the rod 436 as detected by the sensor 470 signals an on and shut off function of the valve spools 264 and 266. Thus a given amount of resin and hardener or sealant is injected in the proper amount from the nozzle or needle 150. All that is necessary to control the flow of resin from the needle 150 is the proportionalizing movement of the respective pistons 428 and 430 as sensed by the sensor 470. The positive pressure is controlled as to the on and off functions by the valve spools 264 and 266.

After injection and centrifugal movement of the sealant into the adjacent interface areas 34 which are filled as seen in FIG. 5, the nests 102 continue to spin at 800 rpm and are cured through the cycle during passage through the tunnel 90. As previously stated, the cure rate can be controlled by temperature or other means when passing through the tunnel 90 by heaters, hot air or the like. Just before station 100B, the cartridges are removed. At this particular point, they are in a cured relationship as to the sealant. The sealed areas create a flexible sealant for the cartridge to avoid migration or channeling of air around the edges of the filter paper 26.

In order to have a proper flow, of urethane, it has been found that the sealant, or urethane combination of the adhesive and hardener should be combined at 1000 to 2000 centipoise (cps). The opening of the needle or nozzle can be approximately 0.045 inches. The range of the needle openings can be 0.015 on either side of the 0.045 inches described thus making the range of openings substantially 0.03 to 0.06 inches in diameter.

From the foregoing, it can be seen that an effective and significant sealing and curing function has been invented which should be covered broadly with the following claims.

What is claimed is:

1. A method for sealing respirator filter cartridge filter media to the inner walls of a cartridge comprising:
   providing a filter cartridge with filter media disposed therein;
   placing a nozzle into the interior of said cartridge;
   moving said nozzle downwardly into the interior of said cartridge and then moving said nozzle toward the periphery of said cartridge before injecting sealant;
   injecting a sealant directly toward the walls of said cartridge through said nozzle while rotating said cartridge;
   drawing flow back from said nozzle at the termination of the injection of sealant; and,
   after injecting sealant, moving said nozzle in the opposite direction.

2. The method as claimed in claim 1 further comprising:
   curing said sealant.

3. The method as claimed in claim 1 further comprising:
   providing said sealant to said nozzle formed from a hardener and a resin from two separate sources.

4. The method as claimed in claim 3 further comprising:
   proportionalizing said resin and hardener from a source of resin and hardener under pressure.

5. The method as claimed in claim 4 wherein:
   said proportionalizing is between two cylinders of proportional size for resin and hardener that are each interconnected to a three way valve to provide flow into said cylinders in two directions.

6. The method as claimed in claim 5 further comprising:
   pistons within and interconnected between each of said hardener and resin cylinders and wherein flow in two directions into each respective cylinder is on either side of the piston of each cylinder.

7. The method as claimed in claim 1 wherein:
   said nozzle is connected to a valve which controls the flow of sealant;
   said valve has at least one spool in a chamber connected to said nozzle; and,
   wherein said drawing back is provided by said spool moving in the opposite direction from the outlet of said nozzle.

8. The method as claimed in claim 7 wherein:
   said valve comprises at least two spools with enlarged heads connected respectively to resin and hardener forming said sealant for respectively drawing back resin and hardener into a chamber into which said enlarged heads project.

9. A method for sealing a respirator cartridge with a filter formed from a filter media enclosed in a container forming said cartridge comprising:
   providing a nozzle having an opening connected to a conduit connected to a source of sealant;
   moving said nozzle downwardly and then toward the interior periphery of the cartridge in order to eject sealant into the peripheral region of the cartridge;
   ejecting a sealant from said nozzle directly toward the wall of said container with sufficient force to reach an area adjacent the wall of said container and said filter media; and,
   drawing sealant back into said nozzle from the opening after the ejecting process.

10. The method as claimed in claim 9 further comprising:
   providing a valve within said conduit having at least one enlarged head in a chamber connected to said nozzle which upon withdrawal draws sealant backwardly into said nozzle.

11. The method as claimed in claim 9 further comprising:
forming said sealant from a source of resin and a source of hardener; and,
proportionalizing said resin and hardener to form said sealant.

12. The method as claimed in claim 9 further comprising:
rotating said cartridge; and,
moving said nozzle into the cartridge and injecting sealant into the periphery of the cartridge as it is rotated.

13. A method for sealing filter media into a respirator cartridge comprising:
supporting a cartridge having filter media therein;
rotating the support for said cartridge;
moving a nozzle into the cartridge for injecting sealant;
injecting sealant from said nozzle connected to a source of sealant into said cartridge directly toward an interior peripheral region between the filter media and the outer wall of said cartridge;
drawing back sealant into said nozzle to prevent residual flow after injecting a desired amount of sealant; and,
withdrawing said nozzle after injection of sealant from said nozzle.

14. The method as claimed in claim 13 further comprising:
sensing whether a cartridge has been implaced on a support.

15. The method as claimed in claim 13 further comprising:
moving said support in a continuous process.

16. The method as claimed in claim 15 further comprising:
moving said support in a continuous process on a rotating support table.

17. The method as claimed in claim 13 further comprising:
proportionalizing a flow of resin and a hardener to form said sealant.

18. The method as claimed in claim 17 further comprising:
proportionalizing the flow of resin with a pair of cylinders connected to a pump having proportional volumes respectively for a hardener and resin for forming said sealant.

* * * * *